United States Patent [19]

Singh

[11] 4,395,915
[45] Aug. 2, 1983

[54] PRESSURE MEASURING APPARATUS

[75] Inventor: Gurnam Singh, Riverside, Calif.

[73] Assignee: Bourns Instruments, Inc., Riverside, Calif.

[21] Appl. No.: 408,296

[22] Filed: Aug. 16, 1982

Related U.S. Application Data

[63] Continuation of Ser. No. 309,331, Oct. 6, 1981, Pat. No. 4,347,745, which is a continuation of Ser. No. 219,418, Dec. 22, 1980, abandoned.

[51] Int. Cl.³ .............................................. G01L 9/04
[52] U.S. Cl. ....................................... 73/720; 73/706; 338/4
[58] Field of Search ................ 73/720, 721, 706, 714, 73/708, 182; 338/4

[56] References Cited

U.S. PATENT DOCUMENTS

| | | | |
|---|---|---|---|
| 2,677,963 | 5/1954 | Mullins, Jr. et al. | 73/182 |
| 2,694,927 | 11/1954 | Coulbourn et al. | 73/182 |
| 2,869,367 | 1/1959 | Moore | 73/182 |
| 3,303,451 | 2/1967 | Yuan | 338/4 |
| 3,343,420 | 9/1967 | Kondo et al. | 73/720 |
| 3,638,481 | 2/1972 | Wilner | 73/141 |
| 3,683,698 | 8/1972 | Tomanec et al. | 73/398 |
| 3,780,588 | 12/1973 | Whitehead, Jr. et al. | 73/721 |
| 3,820,401 | 6/1974 | Lewis | 73/398 |
| 3,894,435 | 7/1975 | Shimada et al. | 73/393 |
| 4,034,610 | 7/1977 | Biddle et al. | 73/398 |
| 4,135,408 | 1/1979 | Di Giovanni | 73/721 |
| 4,157,032 | 6/1979 | Schaberg | 73/141 A |
| 4,161,887 | 7/1979 | Stone et al. | 73/720 |
| 4,172,388 | 10/1979 | Gabrielson | 73/721 |
| 4,182,188 | 1/1980 | Britton et al. | 73/721 |
| 4,203,327 | 5/1980 | Singh | 73/721 |
| 4,212,209 | 7/1980 | Newbold et al. | 73/721 |
| 4,221,134 | 9/1980 | Ekstrom, Jr. | 73/721 |
| 4,347,745 | 9/1982 | Singh | 73/721 |

FOREIGN PATENT DOCUMENTS

| | | |
|---|---|---|
| 1206255 | 9/1970 | United Kingdom . |
| 1481179 | 7/1977 | United Kingdom . |
| 1573934 | 8/1980 | United Kingdom . |

Primary Examiner—Donald O. Woodiel
Attorney, Agent, or Firm—Howard J. Klein; William G. Becker

[57] ABSTRACT

An apparatus which utilizes solid state piezoresistive strain sensing means to measure the static pressure as well as the differential pressure across a primary element, such as an orifice plate, venturi tube, nozzle or wedge. In a preferred embodiment, the apparatus includes a dual pressure sensing transducer comprising a body, means for applying two different pressures to the body, first and second pressure diaphragms respectively, hermetically sealed to the body at first and second spaced apart portions of the body with a back wall of the second diaphragm forming one wall of a chamber which contains a desired reference pressure, a compliant cantilever beam fixedly mounted at one end thereof to the body, a strut wire coupled between the beam and the first diaphragm to cause deflection of the beam in response to movement of the first diaphragm due to an applied differential pressure, a first plurality of piezoresistive strain elements contained on a thinned portion of the beam for deflection therewith so that movement of the first diaphragm will result in changes in the electrical resistance of the first plurality of elements that are indicative of the differential pressure applied across the first diaphragm, a second plurality of piezoresistive strain elements contained on a front wall of the second diaphragm for deflection therewith so that movement of the second diaphragm in response to the static (line) pressure will result in changes in the electrical resistance of the second plurality of elements that are indicative of the static pressure with respect to the reference pressure.

2 Claims, 5 Drawing Figures

PRESSURE MEASURING APPARATUS

CROSS-REFERENCE TO RELATED PATENT APPLICATION

This application is a continuation of my co-pending application Ser. No. 06/309,331; filed Oct. 6, 1981, now U.S. Pat. No. 4,347,745, which is a continuation of application Ser. No. 219,418; filed Dec. 22, 1980, and now abandoned.

The commonly assigned patent application, Ser. No. 285,238, filed July 20, 1981, for "Differential Pressure Transducer With High Compliance, Constant Stress Cantilever Beam," same inventor Gurnam Singh, is related to this application.

BACKGROUND OF THE INVENTION

This invention relates to the field of pressure transducers and particularly to a pressure transducer which measures the static pressure as well as the differential pressure across a primary element, such as an orifice plate, venturi tube, nozzle or wedge.

SUMMARY OF THE INVENTION

Briefly, an apparatus is provided which includes only one pressure transducer for simultaneously measuring both the differential pressure and static pressure of a process fluid flowing through, for example, an orifice.

In a preferred embodiment of the invention, a compliant cantilever beam containing a first plurality of piezoresistive strain gauges is mounted at one end to a first side of the body of a pressure transducer. The beam is connected by means of a strut element to a differential pressure sensing diaphragm to produce a stress in the thinned portion of the beam at the strain gauges in response to a differential pressure applied across the differential pressure sensing diaphragm. A static pressure sensing diaphragm having front and rear walls is mounted on a second wall of the body. The rear wall forms one wall of a chamber which contains a desired reference pressure. Mounted on the front wall of the static pressure sensing diaphragm is a suitably located second plurality of piezoresistive strain gauges. In response to the input line pressure from the process fluid on the second plurality of strain gauges, the static pressure sensing diaphragm measures this input line pressure with respect to the reference pressure to determine the static or line pressure.

In a second embodiment of the invention, a temperature sensing element is also included within the transducer to enable the apparatus to independently measure the differential pressure, the static pressure and the temperature of the process fluid to be measured. A microprocessor and a suitable power supply can be used to provide preselected excitation currents to the first and second pluralities of piezoresistive strain gauges and to compute the gas or fluid mass flow from the resultant differential pressure, static pressure and temperature measurements.

It is therefore an object of this invention to provide a pressure transducer for simultaneously measuring both the differential pressure and static pressure of a process fluid which is generally required for functions such as chemical reaction controls, etc.

Another object of this invention is to provide an apparatus for providing differential pressure, static pressure and temperature measurements to compute the mass flow measurement of a process fluid.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENTS

Figures 1, 4:
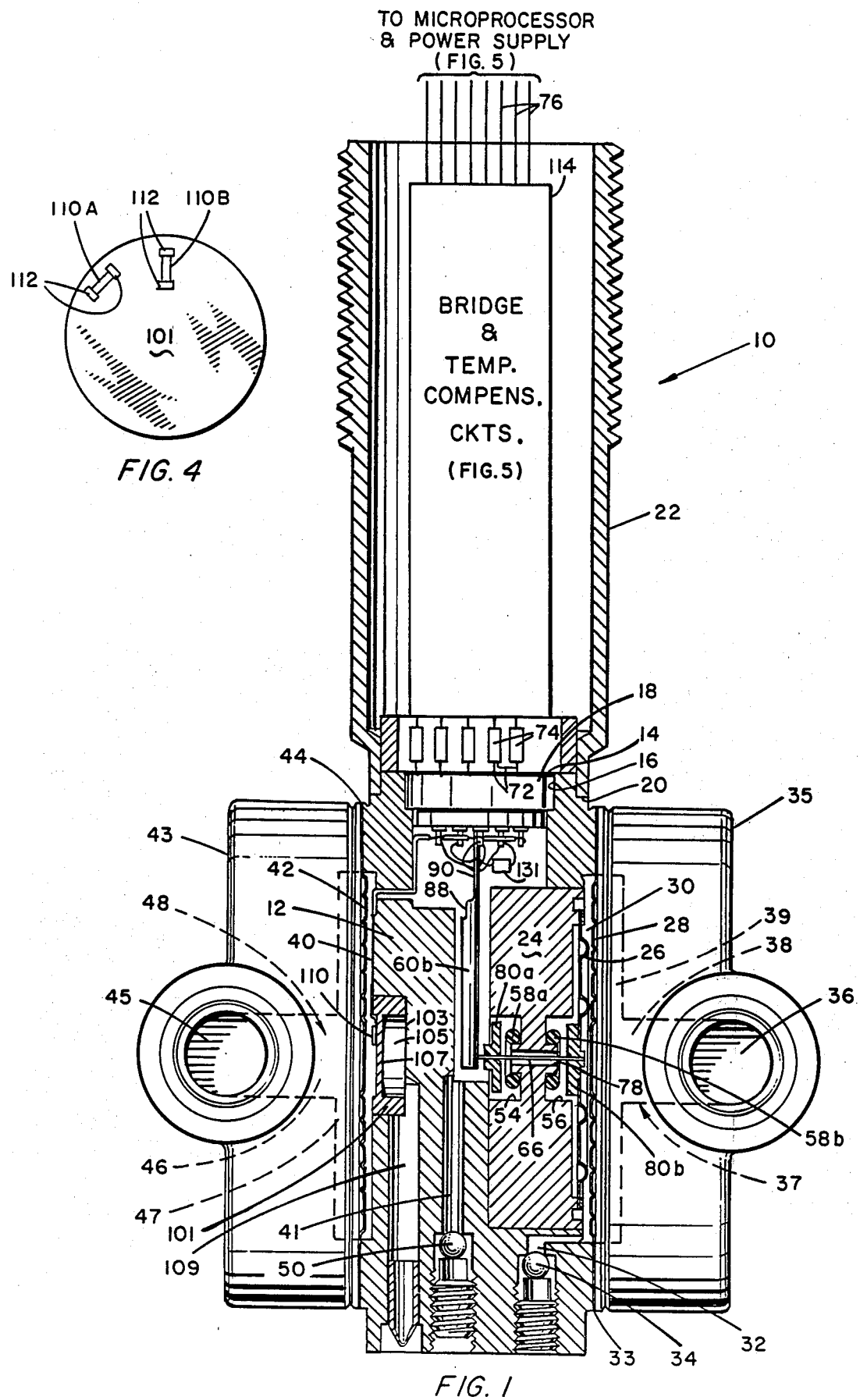
FIG. 1 is a schematic cross-sectional view of a preferred embodiment of the invention.
FIG. 4 is a front view of the static pressure transducer showing the relative placement of the piezoresistive strain gauges associated therewith.

Referring now to the drawings, FIG. 1 illustrates a cross-sectional view of a pressure transducer 10 in conformance with the invention. The transducer 10 has a body 12 preferably of 17-4 or 17-7 stainless steel which is generally circular when viewed from the sides. The top of the body 12 has a flat, upper surface 14 having a stepped orifice 16 into which is fitted a header 18, which will be later described in greater detail. Attached to the body at a shoulder 20 surrounding the flat surface 14 is a cylindrical threaded tube 22.

Seated in a recess in one side of the body 12 is a sensing cell 24 onto which a circular, corrugated, differential pressure sensing diaphragm 26 is mounted. A first isolator diaphragm 28 in combination with a pressure port plate 35 is welded at a peripheral weld 33 to the body 12 external to the sensing diaphragm 26 to form a first fill chamber 30 between the first isolator diaphragm 28 and the sensing diaphragm 26. Inside the welded plate 35, an input pressure port 36 opens into a passageway 38 which joins with a cavity 39 adjacent the isolator diaphragm 28. Thus, the combined welding of the isolator diaphragm 28 and pressure port plate 35 to the body 12 also forms in the transducer a first input pressure chamber 37 comprised of the passageway 38 and cavity 39.

The function of the isolator diaphragm 28, in combination with the pressure port plate 35, is to form a noncorrosive barrier between the sensing cell 24 and the fluid of which the pressure is to be measured by this pressure transducer.

The chamber 30 is filled with an incompressible and degassed liquid such as oil, through a filling port 32, which is sealed with a ball seal 34. Similarly, on the opposite side of the body 12, a second fill chamber 40 is formed between a second isolator diaphragm 42 and the inner side of the differential pressure sensing diaphragm 26. This chamber 40 is also filled through a filling port 41 with the same incompressible and degassed liquid as the first chamber 30, and sealed with ball seal 50.

The second isolator diaphragm 42 in combination with a pressure port plate 43 is welded at a peripheral weld 44 to the body 12. Inside the welded plate 43, an input pressure port 45 opens into a passageway 46 which leads into a cavity 47 adjacent the isolator diaphragm 42. Thus, the combined welding of the isolator diaphragm 42 and pressure port plate 43 to the body 12 forms in the transducer a second input pressure chamber 48 comprised of the passageway 46 and cavity 47.

The input pressure ports 36 and 45 are used for putting a differential pressure (to be measured) across the transducer. In operation, the ports 36 and 45 of the pressure plates 35 and 43 are respectively coupled to suitable fittings (not shown) across an orifice plate, venturi tube, nozzle or wedge (not shown) in an input process fluid path in order to receive two different pressures (high and low pressures) of the process fluid to be tested. These input pressure ports 36 and 45 are respectively located at the low and high pressure sides of the transducer 10. As the differential pressure is applied, via the input pressure ports 36 and 45, the sensing diaphragm 26 drives a beam 60b because of the incompressible filled liquid coupling.

The sensing cell 24 has a symmetrical pair of stepped recesses 54 and 56 on respective sides of the cell. Seated in the innermost portion of the stepped recess 54 is a first O-ring 58a, and in the stepped recess 56 is an O-ring 56b, the purpose of which O-rings will be described later on.

The beam 60b can be a high compliance, constant stress, cantilever beam. Different types of such beams are illustrated in FIGS. 2 and 3, which will now be discussed.

Figure 2:
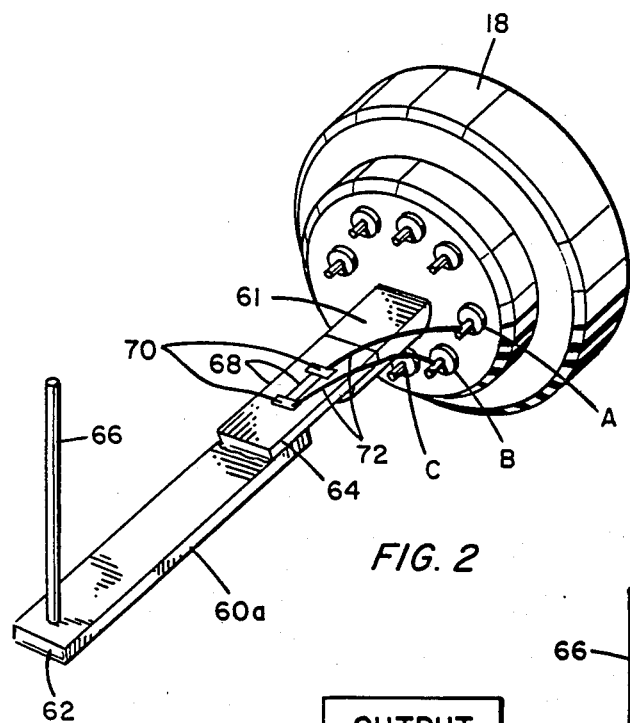
FIG. 2 is a detailed perspective view of the preferred embodiment of the cantilever beam used in the invention.
Figure 3:
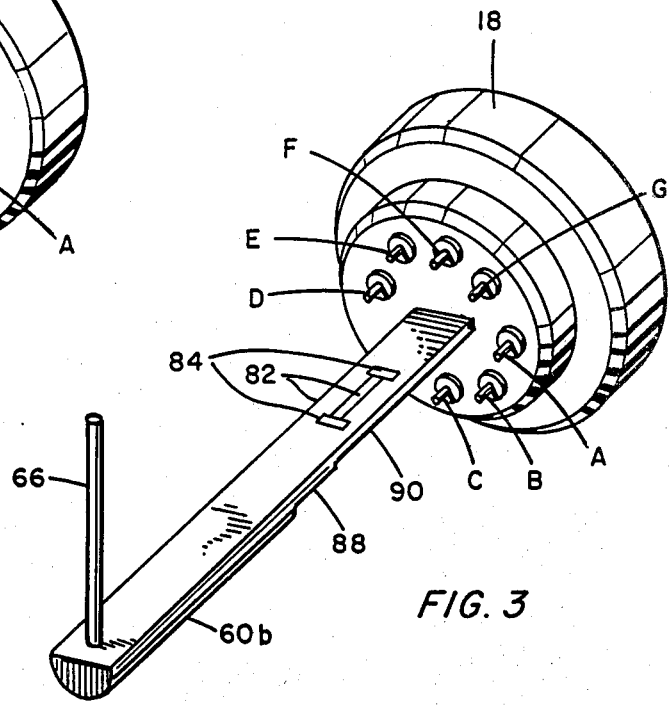
FIG. 3 is a detailed perspective view of an alternative embodiment of the cantilever beam used in the invention.

Referring now to FIG. 2, the beam 60a is shown in two parts: a first portion 61, semicircular in cross-section, is cantilevered from the bottom of the header 18, and a second portion 62, rectangular in cross-section, is spaced from the first portion and is connected thereto by a silicon chip 64 which is bonded (as by epoxy) to the elements 61 and 62. For optimum thermal matching, the portions 61 and 62 are both preferably of the same alloy as the body 12, i.e., 17-4 or 17-7 stainless steel. Attached to the free end of the beam portion 62, and extending perpendicularly therefrom is a strut wire 66, advantageously formed of the same material as the sensor 24, again from considerations of thermal matching.

The silicon chip 64 comprises a high resistivity N-type substrate, having a thickness of approximately 12.5 mils. P-type resistive elements are diffused into the beam to provide two piezoresistive strain gauges 68 on one side of the chip 64. For the sake of clarity, only one of these gauges is shown in FIG. 2. The strain gauges 68 are advantageously arranged to provide one-half of a Wheatstone bridge circuit on this side of the chip 64. This can be accomplished if the P-type strain gauge elements 68 are diffused along the <110> and <110> directions onto a wafer in the <100> plane, and the wafer is sliced so that the chip 64 can be oriented, when bonded to the beam portions 61 and 62, with the strain gauges disposed longitudinally and transversely.

Figure 5:
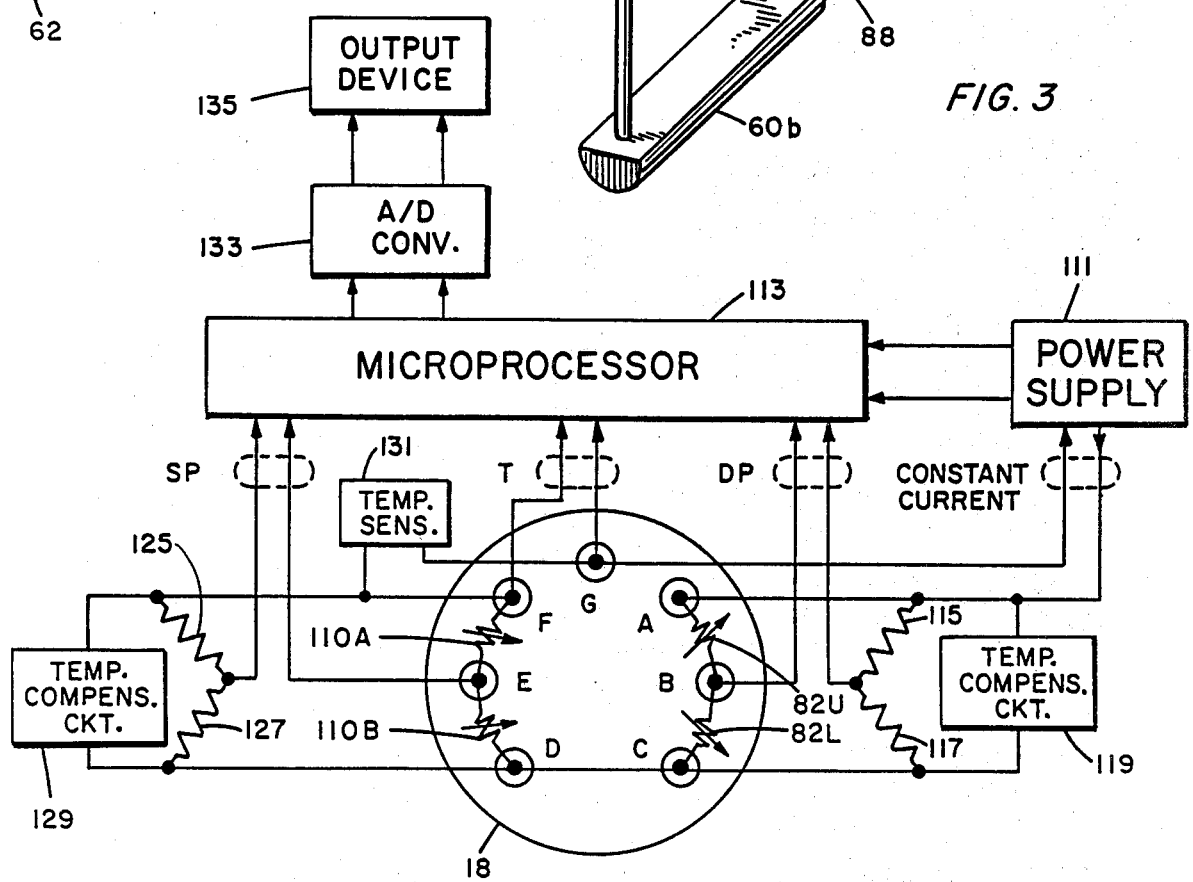
FIG. 5 is a schematic diagram showing the electrical connections between the various pluralities of piezoresistive strain elements and other circuits for computing the mass flow rate of a process fluid.

The half bridge circuit formed by the strain gauges 68 is provided with metallized contact pads 70 for connection, by wires 72, to the bottom portions of terminals A, B and C, which extend through the header 18. Wires 76 for the gauge shown are attached to the other end of the terminals A and B, these wires extending through the tube 22 and into appropriate connectors in the signal processing circuitry (FIG. 5). Wire connections from the other gauge that is not shown in FIG. 2 are connected to the other end of the terminals B and C.

As shown in FIG. 1, the strut wire 66 passes through a strut wire journal 78 in the sensing cell 24, and has its end attached to the center of the sensing diaphragm 26. Mounted on the strut wire 66 are first and second overpressure stops 80a and 80b, which bear against the O-rings 58a and 58b, respectively, to prevent overstress of the beam in overpressure situations respectively involving overpressures from the left and from the right sides as shown in FIG. 1.

Referring again to the specific beam shown in FIG. 2, the beam 60a may advantageously be selected to have a nominal operating strain of 340 micro-inches per inch, and a nominal full-scale deflection of 6.5 mils. This yields a signal-to-deflection ratio of approximately 52 micro-inches per inch per mil, which is quite low, indicating a relatively high compliance compared with prior art beams. This high compliance is a result, at least in substantial part, of the reduced thickness of the silicon chip 64 as compared with the rest of the beam. In the given example (which is for illustrative purposes only), the chip 64 is about 12.5 mils thick, while the beam elements 61 and 62 have a thickness of approximately 65 mils.

This reduced thickness of the chip as compared with the beam is important from another aspect. Because the length of the chip is relatively small in comparison with the entire length of the moment arm (typically less than 25%), and because nearly all of the bending of the beam occurs in the area of the chip (due to its greatly reduced thickness), the stress throughout the area of the strain gauges does not vary greatly, and, in fact can be considered approximately constant throughout this area, which thus develops substantially all of the stress developed by the beam. Because the stress is concentrated in the area of the sensing elements, the beam displays a relatively high signal-to-force ratio, i.e., on the order of about 16. Thus, for example, full-scale deflection, which yields a stress (or signal) of 340 micro-inches per inch, is achieved with an applied force of approximately 21 gm, thereby yielding the aforementioned ratio of 16. This high operational efficiency (which can be considered near-perfect in the sense that nearly all of the applied force is converted into a stress on the strain gauges) enables the achievement of adequate signal levels despite the low signal-to-deflection ratio (high compliance).

Because the beam is highly compliant, proper selection of the sensing diaphragm can result in a transducer that yields acceptable results even at very low differential pressures, i.e., on the order of 1 psi or lower. The principal criterion for selecting the proper diaphragm is the ratio of diaphragm stiffness to beam stiffness (stiffness being the opposite, or inverse, of compliance for our purposes).

Every diaphragm has a "shape factor" α which is defined by the particular corrugation geometry of the diaphragm. Specifically, α may be defined as follows:

$$\alpha = \sqrt{K_1 K_2} \text{ , where}$$

where
$K_1$ is the ratio of the distance, along the diaphragm's surface between corresponding points of two successive corrugations (e.g., peak-to-peak) to the wavelength of the corrugation (the straight line distance between the corresponding points of two successive corrugations); and $K_2$ is the ratio of the moment of inertia of a strip taken along a radius of the corrugated diaphragm, to the moment of inertia of a flat strip having the same thickness and length as the corrugated strip.

It will be appreciated from the foregoing definition of the shape factor $\alpha$ that both $K_1$ and $K_2$ will equal 1 for a flat (uncorrugated) diaphragm. Thus, for such a diaphragm, $\alpha$ will equal 1, while a corrugated diaphragm will have an $\alpha$ which is greater than 1, the particular value being defined by the geometry of the corrugations. For typical diaphragms used in differential pressure transducers of the type disclosed herein, $\alpha$ values usually range between about 5 and about 30.

For such diaphragms, the total force generated by an applied pressure (the "collected force") is given by the formula:

$$F_c = \pi R^2 P; \quad (1)$$

where $F_c$ is the collected force, R is the diaphragm radius (assuming a circular diaphragm), and P is the pressure applied to the diaphragm. In order to get an adequate signal from the transducer, the collected force must be converted to a force applied to the beam ("applied force"). The applied force $F_a$ can be expressed as a fraction of the collected force thusly:

$$F_a = F_c/\omega; \quad (2)$$

where $\omega$ is a number equal to or greater than 1. Solving for $\omega$ we get:

$$\omega = F_c/F_a. \quad (3)$$

It has been determined empirically that for diaphragms having values of alpha of about 6 and above, the value of $\omega$ is no greater than 2.6. This means that for such diaphragms, 2.6 units of collected force on the diaphragm produces at least one unit of applied force on the beam (the force on the diaphragm being transmitted to the beam via the strut wire 66, which is connected to the center of the sensing diaphragm 28, as previously described).

It can be shown that for small diaphragm deflections, the amount of deflection is roughly proportional to the collected force and roughly inversely proportional to the stiffness of the diaphragm. Therefore, since the force applied to the beam is about 0.38 times the collected force, in order for the beam to undergo full-scale deflection for a given collected force, the beam must have a stiffness no more than about 0.38 times the stiffness of the diaphragm. Conversely, the beam must have a compliance of at least about 2.6 times that of the diaphragm.

Using the above described relationship between beam compliance and diaphragm compliance, full-scale beam deflection can be achieved with differential pressures as low as 1.0 psi with the beam constructed as previously described. Thus, the high compliance beam will have a compliance at least about 2.6 times greater than the relatively high compliance sensing diaphragm used to measure such low differential pressures. If higher pressure ranges are to be measured, stiffer diaphragms are substituted, so that the compliance factor is necessarily increased above the minimum of 2.6. In this manner, a range of differential pressures of 1.0 to 60 psi can be accommodated by proper substitution of diaphragms.

It will, of course, be appreciated that, especially where low differential pressures are measured, the isolator diaphragms 28 and 42 must have negligible stiffness as compared with the sensing diaphragm 26.

FIG. 3 illustrates in detail an alternate embodiment of the beam, namely, the beam 60b shown in conjunction with the transducer in FIG. 1. This beam 60b is a one-piece metal element, preferably 17-4 or 17-7 stainless steel (17% chrome, 4%–7% nickel, precipitation hardenable), and is cantilevered at one end with the header 18. The free end of the beam 60b carries a strut wire 66, as in the previously described preferred embodiment.

The portion of the beam 60b near the header 18 is relatively thin and is comprised of a shallow depression 88 and a flat reduced thickness area 90. The area 90, which constitutes no more than about one-third the total length of the beam, should have no more than one-third the thickness of the rest of the beam. By way of specific example, if the body of the beam, which has a semi-circular cross-section, has a maximum thickness of about 65 mils, the reduced thickness area 90 should preferably be no more than about 21 mils thick.

Bonded onto the beam at the reduced thickness area 90 are two piezoelectric strain gauges 82, one on each side. (Only one strain gauge 82 is shown for the sake of clarity). The two strain gauges 82 on both sides of the beam 60b are connected together to form two legs of a first Wheatstone bridge (to be discussed in relation to FIG. 5), which type of bridge is well known in the art. The strain gauges 82 are provided with metallized contact pads 84 for connection of wires (not shown) which lead to the terminals A, B and C.

With the configuration described above, a beam can be constructed which will have, for example, a full-scale deflection of 6.5 mils with a strain of 350 micro-inches per inch, yielding a signal-to-deflection ratio of approximately 53 micro-inches per inch per mil. Full-scale deflection can be achieved with a force of 70 grams (56 gram inches), yielding a signal-to-force ratio of 5.

As with the beam 60a of FIG. 2, substantially all of the stress due to the bending of the beam 60a is concentrated in the reduced thickness area 90. Thus, the reduced thickness area 90 of the beam 60b, like the reduced thickness chip 64 of the beam 60a, provides the beam with a high compliance, while also allowing adequate signal levels to be achieved even with a relatively low signal-to-deflection ratio due to the concentration of the deflection stress in the area of the strain gauge sensors, thereby yielding a relatively high signal-to-force ratio. Moreover, since the reduced thickness area is short in length relative to the total length of the beam, and since the strain gauges typically occupy only about one-third to one-half of the length of the reduced thickness area, the measured stress does not vary greatly along the length of the strain gauges, and thus may be approximated as a constant along the total length of the strain gauges, thereby enhancing the efficiency and accuracy of the transducer.

The metal beam 60b can be incorporated in a transducer, as described above, in which the sensing diaphragm 26 has a shape factor of at least about 6, and a stiffness of at least 2.6 times as great as the beam, to achieve the advantages previously discussed. Thus, the specific example described above can be made with a beam stiffness as low as about 23.7 lbs. per inch. Therefore, to achieve suitable operability over a wide range of differential pressures (down to as low as about 1 psi), the diaphragm should have a stiffness of at least 61.6 lbs. per inch. Again, as stiffer diaphragms are used to accommodate higher pressure ranges, the beam-to-diaphragm compliance ratio will necessarily increase beyond the minimum value of 2.6.

Returning now to FIG. 1, other features of the invention will now be discussed.

A static pressure sensing diaphragm 101, which can be a silicon type of diaphragm, is fixedly mounted against a recessed portion 103 of the body 12 to form a chamber 105 between the portion 103 and the back side 107 of the diaphragm 101. The diaphragm 101 is preferably a flat cup type of diaphragm. However, it could also be a disc-type of diaphragm. This diaphragm 101 is preferably made of 17-4, 17-7 or 15-5 stainless steel. Its size and relative placement within the transducer 10 is dependent upon the specific operation that is desired. In an exemplary application, the diaphragm 101 can be 0.35 inches in diameter, 8.5 mils thick for use with pressures up to about 100 psi and located about 60 mils from the isolator diaphragm to prevent any electrical shorting to the body 12. For other ranges of pressures, the thickness of the diaphragm is scaled up or down, as required.

The chamber 105 of the diaphragm 103 contains a sealed vacuum or is vented to atmosphere or to some other desired reference pressure by way of an evacuation tube 109. A pair of piezoresistive strain sensing elements or gauges 110 are bonded onto or diffused into the front side of the diaphragm 101. The relative placement of these gauges 110 on the front side of the diaphragm 101 is specifically shown in FIG. 4. As shown in FIG. 4, one gauge 110A is positioned circumferentially while another gauge 110B is positioned radially. Metallized contact pads 112 are disposed at opposite ends of each of the gauges 110A and 110B for connection by wires (FIG. 5) to each other and to other resistors (FIG. 5) contained in bridge and temperature compensation circuits 114 of the tube 22 of FIG. 1. The piezoresistive strain gauges 110A and 110B form two legs of a second Wheatstone bridge (shown in FIG. 5).

The high line pressure of the process fluid in the input pressure chamber 48 is applied to the front side of the diaphragm 101 by way of the isolator diaphragm and incompressible and degassed oil in the second fill chamber 40. Since the line or static pressure is applied to the front side of the diaphragm 101 while the back side of the diaphragm 101 is exposed to the reference pressure in the chamber 105, a resultant differential pressure is applied to the diaphragm 101. This differential pressure across the diaphragm 101 causes the diaphragm 101 to move which, in turn, causes a stress in the piezoresistive strain gauges 110A and 110B. The resultant stress in the gauges 110A and 110B changes the electrical resistance of these gauges, thereby unbalancing the associated Wheatstone bridge (FIG. 5). As a result, the Wheatstone bridge associated with the gauges 110A and 110B generates a signal indicative of the static pressure in the high pressure side of the input line that is applied across the pressure port plates 43 and 35.

Up to this point in the discussion, it has been shown how, in a first embodiment of the invention, one transducer 10 determines or measures both the differential pressure applied across the pressure ports 45 and 36 and the static or line pressure at the pressure port 45. This dual pressure transducer 10 thus eliminates the necessity of using two different transducers to respectively measure the differential and static pressures.

In a second embodiment of the invention, the temperature of the process fluid is also measured, in addition to the measurement of the differential and static pressures of the process fluid. A temperature sensing element or sensor 131 (FIG. 1), located near the header 18, is immersed in the incompressible oil in the chamber 40. Sensor 131 may be a thermistor, an RTD (resistance-temperature device), a diode (whose DC resistance changes with temperature) or a thermocouple. The sensor 131 senses the temperature of the process fluid in the chamber 48 by the heat conduction from the process fluid in chamber 48, through the second isolator diaphragm 42 into the incompressible oil in chamber 40. By measuring the temperature and differential and static pressures of the process fluid, the mass flow rate of the process fluid can readily be computed.

The circuitry used for measuring the differential and static pressures and the temperature of the process fluid, as well as the fluid mass flow rate, will now be discussed by referring to FIG. 5.

The piezoresistive strain gauges used on opposite sides of the thinned portion 90 of the beam 60b of FIGS. 1 and 3 are shown in FIG. 5 as 82U (upper) and 82L (lower). Gauge 82U is connected between terminals A and B of header 18, while gauge 82L is connected between terminals B and C of the header 18. As mentioned before, these gauges form one-half of a first Wheatstone bridge. The remaining half of the first Wheatstone bridge is comprised of serially-connected fixed resistors 115 and 117, which have their opposite ends respectively connected to terminals A and B of the header 18. A temperature compensation circuit 119 is preferably coupled across the resultant first Wheatstone bridge between terminals A and B to compensate for temperature variations in the differential pressure (DP) output.

The piezoresistive strain gauges 110A and 110B on the static pressure sensing diaphragm 101 (FIG. 4), which gauges form half of a second Wheatstone bridge, are respectively connected between terminals F and E and between terminals E and D of header 18. The remaining half of the second Wheatstone bridge is comprised of serially-connected fixed resistors 125 and 127, which have their opposite ends respectively connected to terminals F and D of the header 18. A temperature compensation circuit 129 is preferably coupled across the resultant second Wheatstone bridge between terminals F and D to compensate for temperature variations in the static pressure (SP) output.

The fixed resistors 115, 117, 125 and 127 and temperature compensation circuits 119 and 129 are preferably physically located in the bridge and temperature compensation circuits 114 (FIG. 1) and connected to associated terminals of header 18 by wires.

In operation, a power supply 111 furnishes operating voltages to a microprocessor 113. In addition, the supply 111 develops a constant direct current which is used as an excitation current to excite the first and second Wheatstone bridges and to enable the temperature sensor 131 to develop an output voltage proportional to the temperature of the process fluid. More specifically, this constant current from supply 111 is supplied, by way of obvious serial-parallel paths, through the first Wheatstone bridge (comprised of gauges 82U and 82L and fixed resistors 115 and 117, through the second Wheatstone bridge (comprised of gauges 110A and 110B and fixed resistors 125 and 127) and through the temperature sensor 131 back to the power supply 111. Any pressure-induced strain on the pair of gauges (82U, 82L or 110A, 110B) in a Wheatstone bridge will cause those gauges to change their electrical resistances and thereby unbalance that bridge. When unbalanced, a Wheatstone bridge will produce a DC voltage output that is proportional to the differential pressure applied across the diaphragm (26 or 101) associated with that bridge.

A DP signal, which is the DC output voltage that is proportional to the differential pressure, is taken from across the first Wheatstone bridge, between the common connection of the piezoresistive strain gauges 82U and 82L and the common connection of the fixed resistors 115 and 117. Similarly, an SP signal, which is the DC output voltage that is proportional to the static pressure, is taken from across the second Wheatstone bridge, between the common connection of the piezoresistive strain gauges 110A and 110B and the common connection of the fixed resistors 125 and 127. Finally, a T signal, which is the DC output voltage that is proportional to the temperature of the process fluid in the input pressure chamber 48, is taken from across terminals F and G of header 18.

The DP, SP and T signals are applied to the microprocessor 113. The microprocessor 113 is implemented to develop a signal indicative of the mass flow rate M of the process fluid in response to these and other signal inputs.

Mass flow rate measurements are generally required for the performance of functions such as chemical reaction control and gas mass flow rate determinations. The signals required to determine the mass flow rate of a process fluid will now be discussed.

The mass flow rate M of a process fluid (gas or liquid) is given by the following equation:

$$M = \rho A V \qquad (1)$$

where:
 $\rho$ = density of process fluid,
 A = known area at the orifice of the pipe or passage, and
 V = velocity of the process fluid in the pipe or passage.

The density $\rho$ is given by the following equation:

$$\rho = (P/T) \cdot K \qquad (2)$$

where:
 P = static pressure (SP),
 T = temperature of the process fluid, and
 K = a constant known from the molecular weight of the process fluid.

Substituting the value of $\rho$ from EQ(2) into EQ(1), the following relationship is obtained:

$$M = (PK/T) \cdot AV \qquad (3)$$

The values of P and T in EQ(3) are respectively given by the measurement signals SP and T. As indicated above, the values of K and A are known and can either be stored in a memory (not shown) of the microprocessor 113 or externally fed through additional input lines (not shown) to the microprocessor 113. The velocity V is proportional to the square root of the measured value of the differential pressure DP. It can therefore readily be seen that the microprocessor 113 can be implemented to compute M by performing the operations shown in EQ(3).

The output of microprocessor 113 is an analog signal proportional to the mass flow rate M of the process fluid. The analog value of M can be directly utilized, if so required, or converted into a digital signal by an analog-to-digital converter (A/D conv.) 133. The converter 133 may also include a scaler to convert the digitized M signal into desired engineering units, e.g., kilograms per second, pounds per minute, etc.

Either the analog M output from microprocessor 113 can be directly applied (not shown) to an output device 135 or the digital M output from converter 133 can be applied to the output device 135. The device 135 can be, for example, a numerical readout device for indicating the mass flow rate of the process fluid.

The invention thus provides in one embodiment an apparatus which includes a dual pressure transducer for simultaneously measuring both the differential pressure and static pressure of a process fluid flowing through, for example, an orifice. A compliant cantilever beam, having a thinned portion containing a first plurality of piezoresistive strain gauges, is connected via a strut element to a differential pressure sensing diaphragm to produce a stress in the first plurality of gauges in response to a differential pressure applied across the differential pressure sensing diaphragm by way of first and second input pressure ports. A static pressure sensing diaphragm containing a second plurality of piezoresistive strain gauges is also positioned inside the transducer. In response to a differential pressure applied across the static pressure sensing diaphragm by way of the first pressure port and a reference chamber, a stress is produced in the second plurality of gauges. The stresses in the first and second pluralities of strain gauges produce signals indicative of the differential and static pressures applied to the transducer.

In a second embodiment, a sensor is also included within the transducer to effectively measure the temperature to the process fluid. The measured differential pressure, static pressure and temperature signals from the transducer are utilized by a microprocessor to compute the mass flow rate of the process fluid.

While the salient features have been illustrated and described in two embodiments of the invention, it should be readily apparent to those skilled in the art that many changes and modifications can be made in those embodiments without departing from the spirit and scope of the invention. For example, the piezoresistive strain gauges 82U and 82L can be attached to the beam 60b and the piezoresistive strain gauges 110A and 110B can be attached to the static pressure sensing diaphragm 101 by epoxy bonding, glass bonding, vapor deposition or sputtering, diffusion or ion implantation into the substrate, growing on the substrate an epitaxial layer such as silicon on sapphire or silicon on spinel or by any other suitable means. It is therefore intended to cover all such changes and modifications of the invention that fall within the spirit and scope of the invention as set forth in the appended claims.

What is claimed and desired to be secured by Letters Patent of the United States is:

1. A pressure transducer, comprising:
 a body having first and second spaced-apart sides and a first chamber therebetween;
 a first pressure sensing diaphragm connected to and extending across said first chamber to form a fluid-tight cover at said first side;

first means for respectively applying a fluid at first and second pressures to said first and second sides to cause a resultant differential pressure to be applied across said first diaphragm;

a beam having first and second ends with said first end being connected to said body between said first and second sides;

second means coupling said beam to said first diaphragm for producing a movement in said beam in response to the differential pressure applied across said first diaphragm;

a first plurality of strain gauges attached to said beam for deflection therewith, and responsive to the movement of said beam in response to the differential pressure applied across said first diaphragm, for providing a first output signal proportional to said differential pressure;

a second pressure sensing diaphragm disposed within said body, and having a front side exposed to one of said first and second pressures, and a back side fixedly attached at its periphery to said body to form a second chamber between said back side and said body, said second chamber containing a predetermined reference pressure; and a second plurality of strain gauges selectively positioned on said second diaphragm for deflection therewith and responsive to the differential between the pressure to which said front side is exposed and said reference pressure, for providing a second output signal proportional to the pressure to which said front side is exposed.

2. A pressure transducer, comprising:

a body having first and second spaced-apart sides and a first chamber therebetween;

a first pressure sensing diaphragm connected to and extending across said first chamber to form a fluid-tight cover at said first side;

first means for respectively applying a fluid at first and second pressures to said first and second sides to cause a resultant differential pressure to be applied across said first diaphragm;

a beam having first and second ends with said first end being connected to said body between said first and second sides;

second means coupling said beam to said first diaphragm for producing a movement in said beam in response to the differential pressure applied across said first diaphragm;

a first plurality of strain gauges attached to said beam for deflection therewith, and responsive to the movement of said beam in response to the differential pressure applied across said first diaphragm, for providing a first output signal proportional to said differential pressure;

a second chamber in said body containing a predetermined reference pressure;

a second pressure sensing diaphragm mounted in said body and having a front side exposed to one of said first and second pressures via said first chamber, and a back side exposed to said reference pressure via said second chamber; and a second plurality of strain gauges selectively positioned on at least one of said front and back sides of said second diaphragm for deflection therewith and being responsive to the pressure differential between said front and back sides of said second diaphragm, for providing a second output signal proportional to the pressure to which said front side is exposed.

* * * * *

UNITED STATES PATENT OFFICE
CERTIFICATE OF CORRECTION

Patent No. 4,395,915  Dated August 2, 1983

Inventor(s) Gurnam Singh

It is certified that error appears in the above-identified patent and that said Letters Patent are hereby corrected as shown below:

Column 3, Line 56: " $<110>$ and $<110>$ " should read -- $<110>$ and $<1\bar{1}0>$ --.

Column 9, Line 27: "rate M" should read -- rate $\dot{M}$ --.

Column 9, Line 35: "rate M" should read -- rate $\dot{M}$ --.

Column 9, Line 38: "M" should read -- $\dot{M}$ --.

Column 9, Line 58: "M" should read -- $\dot{M}$ --.

Column 10, Line 1: "M" should read -- $\dot{M}$ --.

Column 10, Line 4: "rate M" should read -- rate $\dot{M}$ --.

Column 10, Line 5: "M" should read -- $\dot{M}$ --.

Column 10, Line 9: "M" should read -- $\dot{M}$ --.

UNITED STATES PATENT OFFICE
CERTIFICATE OF CORRECTION

Patent No. 4,395,915　　　　　　　　　Dated  August 2, 1983

Inventor(s)  Gurnam Singh

It is certified that error appears in the above-identified patent and that said Letters Patent are hereby corrected as shown below:

Column 10, Line 11: "M" should read -- $\dot{M}$ --.

Column 10, Line 13: "M" should read -- $\dot{M}$ --.

Column 10, Line 40: "to the process" should read -- of the process --.

Signed and Sealed this

Twenty-seventh Day of March 1984

[SEAL]

Attest:

Attesting Officer

GERALD J. MOSSINGHOFF

*Commissioner of Patents and Trademarks*